(12) United States Patent
Shimoji

(10) Patent No.: US 10,725,325 B2
(45) Date of Patent: Jul. 28, 2020

(54) CONDUCTIVE SUBSTRATE AND LIQUID CRYSTAL TOUCH PANEL

(71) Applicant: SUMITOMO METAL MINING CO., LTD., Tokyo (JP)

(72) Inventor: Takumi Shimoji, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 15/567,460

(22) PCT Filed: Apr. 20, 2016

(86) PCT No.: PCT/JP2016/062463
§ 371 (c)(1),
(2) Date: Oct. 18, 2017

(87) PCT Pub. No.: WO2016/175095
PCT Pub. Date: Nov. 3, 2016

(65) Prior Publication Data
US 2018/0113344 A1    Apr. 26, 2018

(30) Foreign Application Priority Data
Apr. 30, 2015 (JP) ................. 2015-093576

(51) Int. Cl.
*G06F 3/044* (2006.01)
*G02F 1/1333* (2006.01)
(Continued)

(52) U.S. Cl.
CPC ...... *G02F 1/13338* (2013.01); *G02F 1/13439* (2013.01); *G02F 1/133602* (2013.01);
(Continued)

(58) Field of Classification Search
CPC ............ G02F 1/13338; G02F 1/13439; G02F 1/133602; G06F 3/0412; G06F 3/044; G06F 2203/04112
See application file for complete search history.

(56) References Cited

U.S. PATENT DOCUMENTS 7,534,500 B2    5/2009  Kobayashi et al.
2005/0001963 A1*  1/2005  Yokoyama ........ G02F 1/133555
                                                              349/122
(Continued)

FOREIGN PATENT DOCUMENTS

JP    2003-151358    5/2003
JP    2011-018194    1/2011
(Continued)

OTHER PUBLICATIONS

International Search Report dated May 31, 2016 with respect to PCT/JP2016/062463.

*Primary Examiner* — Amit Chatly
(74) *Attorney, Agent, or Firm* — IPUSA, PLLC

(57) ABSTRACT

A conductive substrate is provided that is arranged on an image display surface of a liquid crystal panel. The conductive substrate includes a transparent base material, a metal layer formed on at least one surface of the transparent base material, and a blackened layer formed on at least one surface of the transparent base material. Provided the color of the image display surface of the liquid crystal panel during backlight-off time, when converted into the CIE (L*a*b*) color space, has a b* value denoted as "$b^*_{panel}$", the color of the blackened layer, when converted into the CIE (L*a*b*) color space, has a b* value that satisfies the following Formula 1:

$$(b^*_{panel}+1) \geq b^* \geq (b^*_{panel}-3.5) \quad \text{Formula 1.}$$

6 Claims, 3 Drawing Sheets

(51) Int. Cl.
*G02F 1/1343* (2006.01)
*G02F 1/13357* (2006.01)
*G06F 3/041* (2006.01)

(52) U.S. Cl.
CPC ............ *G06F 3/044* (2013.01); *G06F 3/0412* (2013.01); *G06F 2203/04112* (2013.01)

(56) References Cited

U.S. PATENT DOCUMENTS

| | | |
|---|---|---|
| 2011/0045260 A1 | 2/2011 | Lee et al. |
| 2015/0205326 A1* | 7/2015 | Lim .................. B32B 15/04 345/174 |
| 2015/0223326 A1 | 8/2015 | Lim et al. |
| 2016/0014905 A1* | 1/2016 | Tsunekawa ............ B32B 33/00 345/173 |

FOREIGN PATENT DOCUMENTS

| | | | |
|---|---|---|---|
| JP | 2011-037258 | | 2/2011 |
| JP | 2012-79238 | | 4/2012 |
| JP | 2013-069261 | | 4/2013 |
| JP | 3195832 | * | 1/2014 |
| JP | 2014-194655 | | 10/2014 |
| JP | 3195832 U | | 2/2015 |
| TW | 201423771 | | 6/2014 |
| TW | M496163 U | | 2/2015 |

\* cited by examiner

CONDUCTIVE SUBSTRATE AND LIQUID CRYSTAL TOUCH PANEL

TECHNICAL FIELD

The present invention relates to a conductive substrate and a liquid crystal touch panel.

BACKGROUND ART

Capacitive liquid crystal touch panels that are recently used in various applications detect a change in electrostatic capacitance caused by an object coming close to the panel surface and convert position information of the object coming close to the panel surface into an electric signal.

A conductive substrate used in a capacitive liquid crystal touch panel is arranged on the surface of the liquid crystal panel, and as such, the material of a conductive layer of the conductive substrate is required to have low reflectance and low visibility.

Thus, a material with low reflectance and low visibility is used as the material of the conductive layer of a conductive substrate used in a capacitive touch panel, and the conductive layer is formed on a transparent substrate or a transparent film. For example, Patent Document 1 discloses a transparent conductive film for a touch panel including an ITO (indium oxide-tin) film formed as a transparent conductive film on a polymer film.

In recent years, the screens of displays provided with touch panels are becoming increasingly larger, and as such, there is a demand for increasing the size of conductive substrates, such as transparent conductive films for touch panels. However, because ITO has high electrical resistance and is susceptible to signal degradation, it is not suitable for use in a large panel.

In this respect, use of a metal foil made of copper or the like instead of an ITO film has been contemplated as described in Patent Documents 2 and 3, for example. However, when a metal foil made of copper or the like is used in place of an ITO film, for example, because a metal foil made of copper or the like has metallic luster, visibility of the liquid display panel may be degraded due to light reflection.

Accordingly, a conductive substrate having a metal layer made of copper or the like and a blackened layer made of a material that can restrict light reflection at the surface of the metal foil made of copper or the like is being contemplated. By forming such a blackened layer, light reflectance of the conductive substrate can be reduced and wiring formed by patterning a metal layer may be less visible such that visibility of the liquid crystal panel may be improved, for example.

PRIOR ART DOCUMENTS

Patent Documents

Patent Document 1: Japanese Unexamined Patent Publication No. 2003-151358
Patent Document 2: Japanese Unexamined Patent Publication No. 2011-018194
Patent Document 3: Japanese Unexamined Patent Publication No. 2013-069261

SUMMARY OF THE INVENTION

Problem to be Solved by the Invention

However, in a conventional conductive substrate, when the backlight of the liquid crystal panel is turned off, the wiring of the conductive substrate may become visually conspicuous. In terms of further enhancing the performance of the liquid crystal touch panel, there is a demand for a conductive substrate with a wiring that would be inconspicuous even when the backlight of the liquid crystal panel is turned off.

In view of the above problems of the related art, one aspect of the present invention is directed to providing a conductive substrate having a wiring that is inconspicuous even when the backlight of the liquid crystal panel is turned off.

Means for Solving the Problem

According to one embodiment of the present invention, a conductive substrate is provided that is arranged on an image display surface of a liquid crystal panel. The conductive substrate includes a transparent base material, a metal layer formed on at least one surface of the transparent base material, and a blackened layer famed on at least one surface of the transparent base material. Provided the color of the image display surface of the liquid crystal panel during backlight-off time, when converted into the CIE (L*a*b*) color space, has a b* value denoted as "$b^*_{panel}$", the color of the blackened layer, when converted into the CIE (L*a*b*) color space, has a b* value that satisfies the following Formula 1:

$$(b^*_{panel}+1) \geq b^* \geq (b^*_{panel}-3.5) \qquad \text{Formula 1.}$$

Advantageous Effect of the Invention

According to an aspect of the present invention, a conductive substrate may be provided that has a wiring that is inconspicuous even when the backlight of the liquid crystal panel is turned off.

EMBODIMENT FOR IMPLEMENTING THE INVENTION

Figure 1A:
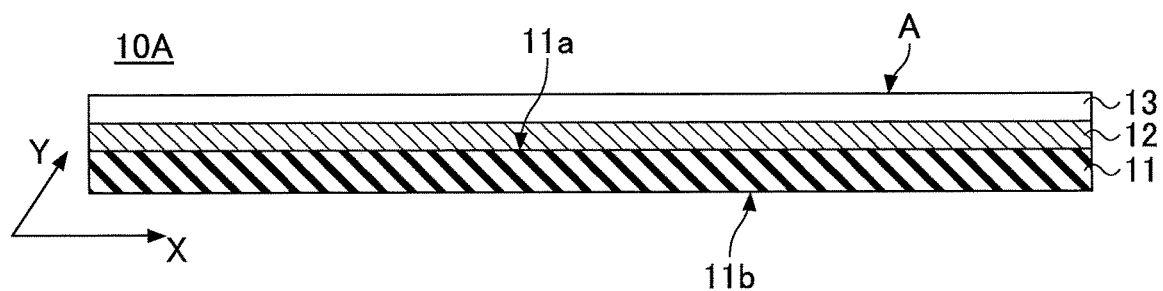
FIG. 1A is a cross-sectional view of a conductive substrate according to an embodiment of the present invention.

In the following, embodiments of a conductive substrate and a method of fabricating a conductive substrate according to the present invention are described.

(Conductive Substrate)

A conductive substrate according to an embodiment of the present invention may be arranged on an image display surface of a liquid crystal panel, and the conductive substrate may include a transparent base material, a metal layer formed on at least one surface of the transparent base material, and a blackened layer formed on at least one surface of the transparent base material.

Further, provided the color of the image display surface of the liquid crystal panel during backlight-off time, when converted into the CIE (L*a*b*) color space, has a b* value denoted as "b*$_{panel}$", the color of the blackened layer, when converted into the CIE (L*a*b*) color space, has a b* value preferably satisfying the following Formula 1.

$$(b^*_{panel}+1) \geq b^* \geq (b^*_{panel}-3.5) \quad \text{Formula 1}$$

Note that the conductive substrate according to the present embodiment includes a substrate made up of a transparent base material having a metal layer and a blackened layer formed thereon in a state before the metal layer and the like are patterned, and a substrate after the metal layer and the like are patterned, namely, a wired substrate. The conductive substrate including the metal layer and the blackened layer that have been patterned is a transparent conductive film that includes regions of the transparent base material that are not covered by the metal layer and the like and can therefore transmit light.

In the following, members included in the conductive substrate according to the present embodiment will be described.

The transparent base material is not particularly limited, and a resin substrate (resin film) that transmits visible light or a glass substrate may be suitably used, for example.

Example preferred materials of the resin substrate that transmits visible light include a polyamide resin, a polyethylene terephthalate resin, a polyethylene naphthalate resin, a cycloolefin resin, a polyimide resin, and a polycarbonate resin.

Of the above resin materials, PET (polyethylene terephthalate), COP (cycloolefin polymer), PEN (polyethylene naphthalate), polyamide, polyimide, and polycarbonate may be suitably used as the material of the resin substrate that transmits visible light, for example.

In particular, polyethylene terephthalate may be suitably used as the transparent base material.

The thickness of the transparent base material is not particularly limited and can be selected in view of the required strength, the electrostatic capacity, and the light transmittance of the conductive substrate, for example. The thickness of the transparent base material may be greater than or equal to 10 μm and less than or equal to 200 μm, for example. In particular, when used for liquid crystal touch panel applications, the thickness of the transparent base material may preferably be greater than or equal to 20 μm and less than or equal to 100 μm, for example. When used for liquid crystal touch panel applications, and particularly for applications requiring a reduced thickness of the overall liquid crystal touch panel, the thickness of the transparent base material may preferably be greater than or equal to 20 μm and less than or equal to 50 μm, for example.

The transparent base material preferably has a relatively high total light transmittance. For example, the total light transmittance of the transparent base material may preferably be greater than or equal to 30%, and more preferably greater than or equal to 60%. When the total light transmittance of the transparent base material is within the above range, visibility of the liquid crystal panel can be sufficiently secured when the transparent base material is used for a liquid crystal touch panel application, for example.

The total light transmittance of the transparent base material can be evaluated by the method specified in JIS K 7361-1.

In the following, the metal layer will be described.

The material constituting the metal layer is not particularly limited, and a material having electrical conductivity suitable for the application can be selected. For example, the material constituting the metal layer may be a copper alloy made up of Cu and at least one type of metal selected from a group consisting of Ni, Mo, Ta, Ti, V, Cr, Fe, Mn, Co, and W; or a material containing copper. Also, the metal layer may be a copper layer made of copper, for example. The metal layer is preferably a copper layer or a copper alloy layer in view of their high electrical conductivity.

The method of forming the metal layer is not particularly limited, but in order to avoid a decrease in light transmittance, the metal layer is preferably famed without applying an adhesive between the metal layer and another member. That is, the metal layer is preferably formed directly on at least one surface of the transparent base material. Note that in a case where an adhesion layer is arranged between the transparent base material and the metal layer as described below, the metal layer is preferably formed directly on the upper surface of the adhesion layer.

Because the metal layer is directly formed on the upper surface of the transparent base material, the metal layer preferably includes a metal thin film layer. Also, the metal layer may include a metal thin film layer and a metal plating layer.

For example, a metal thin film layer may be formed on the transparent base material by a dry plating method, and such metal thin film layer may constitute the metal layer. In this way, a metal layer may be directly formed on the transparent base material without using an adhesive. Note that the dry plating method used may preferably be a sputtering method, a vapor deposition method, or an ion plating method, for example.

Also, to increase the thickness of the metal layer, a metal plating layer may be formed by electroplating, which is a type of a wet plating method, using the metal thin film layer as a power feeding layer, and in this way, the metal layer including the metal thin film layer and the metal plating layer may be formed, for example. The metal layer including the metal thin film layer and the metal plating layer can also be formed directly on the transparent base material without using an adhesive.

The thickness of the metal layer is not particularly limited and can be selected in view of the magnitude of the current supplied to the metal layer when it is used as a wiring and the wiring width, for example.

However, when the thickness of the metal layer increases, more time is required to etch the metal layer to form a wiring pattern, and as a result, side etching may be more liable to occur and forming a thin line may become difficult, for example. As such, the thickness of the metal layer is preferably less than or equal to 5 μm, and more preferably less than or equal to 3 μm.

Also, from the viewpoint of lowering the resistance value of the conductive substrate and allowing sufficient supply of electric current, for example, the thickness of the metal layer is preferably greater than or equal to 50 nm, more preferably greater than or equal to 60 nm, and more preferably greater than or equal to 150 nm.

In the case where the metal layer includes the metal thin film layer and the metal plating layer as described above, the total thickness of the metal thin film layer and the metal plating layer is preferably within the above range.

The thickness of the metal thin film layer is not particularly limited regardless of whether the metal layer is made up of the metal thin film layer or whether the metal layer is made up of the metal thin film layer and the metal plating layer. However, in either case, the thickness of the metal thin film layer is preferably greater than or equal to 50 nm and less than or equal to 500 nm, for example.

As described below, the metal layer may be patterned into a desired wiring pattern so that the metal layer may be used as a wiring. Because the electrical resistance of the metal layer may be lower than that of ITO, which has conventionally been used as a transparent conductive film, the electrical resistance of the conductive substrate may be reduced by providing the metal layer.

In the following, the blackened layer will be described.

The material of the blackened layer is not particularly limited, and any material that is capable of reducing light reflection at the surface of the metal layer can be suitably used.

The blackened layer preferably contains at least one metal selected from a group consisting of Ni, Zn, Mo, Ta, Ti, V, Cr, Fe, Co, W, Cu, Sn and Mn, for example. The blackened layer may further contain at least one element selected from a group consisting of carbon, oxygen, hydrogen, and nitrogen, for example.

Note that the blackened layer may include a metal alloy containing at least two metals selected from a group consisting of Ni, Zn, Mo, Ta, Ti, V, Cr, Fe, Co, W, Cu, Sn, and Mn. Also, in this case, the blackened layer may further contain at least one element selected from a group consisting of carbon, oxygen, hydrogen and nitrogen. Preferred examples of the metal alloy containing at least two metals selected from the group consisting of Ni, Zn, Mo, Ta, Ti, V, Cr, Fe, Co, W, Cu, Sn and Mn include a Cu—Ti—Fe alloy, a Cu—Ni—Fe alloy, a Ni—Cu alloy, a Ni—Zn alloy, a Ni—Ti alloy, a Ni—W alloy, a Ni—Cr alloy, and a Ni—Cu—r alloy.

The method for fainting the blackened layer is not particularly limited, and any method can be used. For example, a dry method or a wet method may be used to form the blackened layer.

In the case of forming the blackened layer using a dry method, although the specific dry method used is not particularly limited, a dry plating method, such as a sputtering method, an ion plating method, or a vapor deposition method, may be suitably used, for example. In the case of forming the blackened layer using a dry method, a sputtering method is preferably used in view of enabling easy control of the film thickness. As described above, at least one element selected from a group consisting of carbon, oxygen, hydrogen, and nitrogen may be added to the blackened layer, and in this case, a reactive sputtering method is preferably used to foils the blackened layer.

In the case of forming the blackened layer using a reactive sputtering method, a sputtering target including the type of metal constituting the blackened layer may be used. In the case where the blackened layer includes an alloy, a sputtering target of each type of metal included in the blackened layer may be used and the alloy may be formed at the surface of the film forming body, such as a substrate, for example. Alternatively, the types of metal making up the alloy included in the blackened layer may be prepared beforehand as a sputtering target and such sputtering target may be used to form the blackened layer, for example.

Also, in the case where the blackened layer includes at least one element selected from a group consisting of carbon, oxygen, hydrogen, and nitrogen, the element can be added to the blackened layer by adding a gas containing the element to the atmosphere upon forming the blackened layer. For example, in the case of adding carbon to the blackened layer, carbon monoxide and/or carbon dioxide gas may be added to the atmosphere during sputtering; in the case of adding oxygen to the blackened layer, oxygen gas may be added to the atmosphere during sputtering; in the case of adding hydrogen to the blackened layer, hydrogen gas and/or water may be added to the atmosphere during sputtering; and in the case of adding nitrogen to the blackened layer, nitrogen gas may be added to the atmosphere during sputtering. By adding at least one of the above gases to an inert gas that is supplied upon forming the blackened layer, at least one element selected from the group consisting of carbon, oxygen, hydrogen, and nitrogen may be added to the blackened layer. Note that argon gas is preferably used as the inert gas.

In the case of forming the blackened layer using a wet method, for example, an electroplating method may be implemented using a plating solution corresponding to the material of the blackened layer.

Although the thickness of the blackened layer is not particularly limited, for example, the thickness of the blackened layer may preferably be greater than or equal to 15 nm, and more preferably greater than or equal to 25 nm. Note that if the blackened layer is too thin, light reflection at the surface of the metal layer may not be sufficiently controlled. By arranging the thickness of the blackened layer to be greater than or equal to 15 nm as described above, light reflection at the surface of the metal layer can reliably controlled.

Also, although there is no particular upper limit to the thickness of the blackened layer, if the blackened layer is thicker than necessary, the etching time required for forming the wiring becomes longer to thereby lead to a cost increase. As such, the thickness of the blackened layer is preferably less than or equal to 70 nm, and more preferably less than or equal to 50 nm.

In the following, example configurations of the conductive substrate will be described.

By arranging the blackened layer on the conductive substrate according to the present embodiment, light reflection at the surface of the metal layer can be controlled. In this way, when the conductive substrate is used for a liquid crystal touch panel application, for example, visibility of the liquid crystal panel may be prevented from being degraded.

As described above, in an application using a conventional conductive substrate, when the backlight of a liquid crystal panel is turned off, the wiring of the conductive substrate may become visually conspicuous. Thus, from the perspective of improving performance of the liquid crystal touch panel, there has been a demand for a conductive substrate with a wiring that would not be visually conspicuous even when the backlight of the liquid crystal panel is turned off.

In this respect, the inventor of the present invention has conducted investigations on the factors that cause the wiring of conventional conductive substrates to become visually conspicuous. The inventor has thus discovered that in conventional conductive substrates, the wiring of the conductive substrate becomes visually conspicuous when there is a large difference between the color of an image display surface and the color of the blackened layer when the backlight of the liquid crystal panel is turned off. The present invention has been conceived upon finding that by controlling the difference between the color of the image display surface and the color of the blackened layer, in particular, the difference in their b* values when converted into the CIE (L*a*b*) color space, to be within a predetermined range, the wiring of the conductive substrate can be prevented from becoming visually conspicuous even when the backlight of the liquid crystal panel is turned off.

In the conductive substrate according to the present embodiment, provided the color of the image display surface of the liquid crystal panel during backlight-off time, when converted into the CIE (L*a*b*) color space, has a b* value denoted as "$b^*_{panel}$", the color of the blackened layer, when converted into the CIE (L*a*b*) color space, preferably has a b* value satisfying the following Formula 1.

$$(b^*_{panel}+1) \geq b^* \geq (b^*_{panel}-3.5) \quad \text{Formula 1}$$

Further, according to investigations conducted by the inventors of the present invention, in order to make the wiring less conspicuous when the backlight of the liquid crystal panel is turned off, the difference in the a* values of the color of the image display surface during backlight-off time and the color of the blackened layer, when converted into the CIE (L*a*b*) color space, is also preferably controlled to be within a predetermined range.

Thus, provided the color of the image display surface during backlight-off time, when converted into the CIE (L*a*b*) color space, has an a* value denoted as "$a^*_{panel}$", the color of the blackened layer, when converted into the CIE (L*a*b*) color space, preferably has an a* value satisfying the following Formula 2.

$$(a^*_{panel}+0) \geq a^* \geq (a^*_{panel}-3.5) \quad \text{Formula 2}$$

Note that the method used to control the b* value and the a* value of the color of the blackened layer converted into the CIE (L*a*b*) color space to be within the above predetermined ranges is not particularly limited. For example, the color of the blackened layer may be controlled to be within the desired predetermined ranges by selectively adjusting the thickness and the material of the blackened layer. For example, at least one element selected from the group consisting of carbon, oxygen, hydrogen, and nitrogen can be added to the blackened layer, and in this case, the color of the blackened layer may be controlled to have the desired b* value and a* value by adjusting the amount of the one or more elements selected from the group consisting of carbon, oxygen, hydrogen, and nitrogen.

Note that a layer other than the transparent base material, the metal layer, and the blackened layer may optionally be provided on the conductive substrate according to the present embodiment. For example, an adhesion layer can be provided on the conductive substrate.

In the following, an example configuration of the adhesion layer will be described.

As described above, the metal layer may be foamed on the transparent base material. However, when the metal layer is directly foamed on the transparent base material, adhesion between the transparent base material and the metal layer may not be sufficient in some cases. Therefore, when the metal layer is directly formed on the upper surface of the transparent base material, the metal layer may be peeled off from the transparent base material during fabrication or use, for example.

Accordingly, in the conductive substrate according to the present embodiment, an adhesion layer may be arranged on the transparent base material in order to enhance adhesion between the transparent base material and the metal layer.

By arranging the adhesion layer between the transparent base material and the metal layer, adhesion between the transparent base material and the metal layer can be enhanced, and peeling of the metal layer from the transparent base material can be prevented.

Further, the adhesion layer can also function as a blackened layer. Thus, light reflection at the lower surface of the metal layer, that is, reflection of light from the transparent base material side by the metal layer, can also be prevented.

Note that the material constituting the adhesion layer is not particularly limited and may be suitably selected in view of adhesion between the transparent substrate and the metal layer, the extent to which light reflection at the surface of the metal layer has to be controlled, and the degree of stability with respect to the environment in which the conductive substrate is used (e.g., humidity, temperature) in which the conductive substrate is used, for example.

The adhesion layer preferably contains at least one metal selected from a group consisting of Ni, Zn, Mo, Ta, Ti, V, Cr, Fe, Co, W, Cu, Sn and Mn, for example. The adhesion layer may further contain one or more elements selected from a group consisting of carbon, oxygen, hydrogen, and nitrogen.

The adhesion layer may include a metal alloy containing at least two metals selected from the group consisting of Ni, Zn, Mo, Ta, Ti, V, Cr, Fe, Co, W, Cu, Sn and Mn, for example. The adhesion layer may further contain one or more elements selected from the group consisting of carbon, oxygen, hydrogen, and nitrogen.

Preferred examples of the metal alloy containing at least two metals selected from the group consisting of Ni, Zn, Mo, Ta, Ti, V, Cr, Fe, Co, W, Cu, Sn and Mn include a Cu—Ti—Fe alloy, a Cu—Ni—Fe alloy, a Ni—Cu alloy, a Ni—Zn alloy, a Ni—Ti alloy, a Ni—W alloy, a Ni—Cr alloy, and a Ni—Cu—Cr alloy.

Although the method for forming the adhesion layer is not particularly limited, the adhesion layer is preferably famed by a dry plating method. Preferred examples of the dry plating method that may be used include a sputtering method, an ion plating method, a vapor deposition method, and the like. In the case of forming the adhesion layer by a dry method, a sputtering method is preferably used in view of enabling easy control of the film thickness. As described above, one or more elements selected from the group consisting of carbon, oxygen, hydrogen, and nitrogen can be added to the adhesion layer, and in this case, a reactive sputtering method may preferably be used to foam the adhesion layer.

In the case where the adhesion layer contains at least on element selected from the group consisting of carbon, oxygen, hydrogen, and nitrogen, the element can be added to the adhesion layer by adding a gas containing the element to the atmosphere upon forming the adhesion layer. For example, in the case of adding carbon to the adhesion layer, carbon monoxide and/or carbon dioxide gas may be added to the atmosphere during dry plating; in the case of adding oxygen to the adhesion layer, oxygen gas may be added to the atmosphere during dry plating; in the case of adding hydrogen to the adhesion layer, hydrogen gas and/or water may be added to the atmosphere during dry plating; and in the case of adding nitrogen to the blackened layer, nitrogen gas may be added to the atmosphere during dry plating.

At least one of the above gases is preferably added to an inert gas that is used as atmospheric gas for performing dry plating to form the adhesion layer. Although the inert gas is not limited to a particular type of gas, argon gas may be suitably used as the inert gas, for example.

By forming the adhesion layer using the dry plating method as described above, adhesion between the transparent base material and the adhesion layer can be enhanced. Because the adhesion layer can contain a metal as a main component, for example, the adhesion layer may have high adhesion to the metal layer. Thus, peeling of the metal layer can be prevented by arranging the adhesion layer between the transparent base material and the metal layer.

Although the thickness of the adhesion layer is not particularly limited, the thickness of the adhesion layer may preferably be greater than or equal to 3 nm and less than or equal to 50 nm, more preferably greater than or equal to 3 nm and less than or equal to 35 nm, and more preferably greater than or equal to 3 nm and less than or equal to 33 nm, for example.

In the case where the adhesion layer is to function as a blackened layer, namely, in the case where the adhesion layer is to control light reflection by the metal layer, the thickness of the adhesion layer is preferably arranged to be greater than or equal to 3 nm as described above.

Although there is not particular upper limit to eh thickness of the adhesion layer, when the adhesion layer is made thicker than necessary, the process time required for film formation and the etching time required for forming a wiring become long to thereby lead to a cost increased, for example. In this respect, the thickness of the adhesion layer is preferably less than or equal to 50 nm, more preferably less than or equal to 35 nm, and more preferably less than or equal to 33 nm as described above.

Although the color of the adhesion layer is not particularly limited, when the wiring layer is formed by patterning a metal layer or the like, the adhesion layer may be visible from the outside through the transparent base material. As such, the color of the adhesion layer, when converted into the CIE (L*a*b*) color space, is also preferably controlled to have a b* value satisfying the above Formula 1 so that the adhesion layer can be prevented from being visually conspicuous when arranged on the image display surface of the liquid crystal panel.

More preferably, the color of the adhesion layer, when converted into the CIE (L*a*b*) color space, is controlled to have an a* value satisfying the above Formula 2.

As described above, the conductive substrate according to the present embodiment may include a transparent base material, a metal layer, and a blackened layer. Further, a layer such as an adhesion layer can be optionally provided. Note that the order in which the metal layer and the blackened layer are laminated on the transparent base material is not particularly limited. Further, a plurality of metal layers and blackened layers may be formed.

In the following, specific configuration examples will be described below with reference to FIGS. 1A, 1B, 2A, and 2B. FIGS. 1A, 1B, 2A, and 2B are example cross-sectional views of the conductive substrate according to the present embodiment on a plane parallel to the lamination direction of the transparent base material, the metal layer, and the blackened layer.

The conductive substrate according to the present embodiment may have a metal layer and a blackened layer successively laminated in the above recited order on at least one surface of the transparent base material, for example.

Specifically, for example, as in a conductive substrate 10A shown in FIG. 1A, a metal layer 12 and a blackened layer 13 may be successively laminated on one surface 11a of a transparent base material 11 in the above recited order. Also, as in a conductive substrate 10B shown in FIG. 1B, metal layers 12A and 12B and blackened layers 13A and 13B may respectively be laminated on the one surface 11a and another surface (other surface) 11b of the transparent base material 11 in the above recited order.

Further, another layer, such as an adhesion layer, may optionally be provided. In this case, for example, the adhesion layer, the metal layer, and the blackened layer may be successively formed in the above recited order on at least one surface of the transparent base material from the transparent base material side, for example.

Figure 2A:
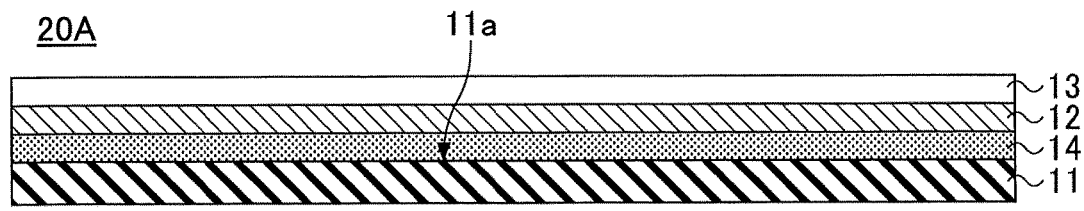
FIG. 2A is a cross-sectional view of a conductive substrate according to an embodiment of the present invention.

Specifically, for example, as in a conductive substrate 20A shown in FIG. 2A, an adhesion layer 14, the metal layer 12, and the blackened layer 13 may be successively laminated in the above recited order on the one surface 11a of the transparent substrate 11.

Also, the laminated layers of the adhesion layer, the metal layer, and the blackened layer may be famed on both surfaces of the transparent base material 11, for example. Specifically, as in a conductive substrate 20B shown in FIG. 2B, adhesion layers 14A and 14B, the metal layers 12A and 12B, and the blackened layers 13A and 13B may respectively be formed on the one surface 11a and the other surface 11b of the transparent substrate 11 in the above recited order.

Note that in FIGS. 1B and 2B where the metal layer, the blackened layer, and the like are laminated on both surfaces of the transparent base material, the layers laminated above and below the transparent base material 11 are arranged to be symmetric with respect to the transparent base material 11. However, the present invention is not limited to such an arrangement. For example, in FIG. 2B, the layers laminated on the one surface 11a of the transparent base material 11 may alternatively have a configuration similar to that of FIG. 1B, having the metal layer 12A and the blackened layer 13A laminated in the above recited order without arranging the adhesion layer 14A, and in this way, the layers laminated above and below the transparent base material 11 may be asymmetric.

In the conductive substrate according to the present embodiment, light reflection by the metal layer can be controlled by arranging the metal layer and the blackening layer on the transparent base material.

Although the extent of light reflection by the conductive substrate according to the present embodiment is not particularly limited, for example, when used as a conductive substrate for a liquid crystal touch panel, the conductive substrate preferably has a relatively low average reflectance for light with a wavelength greater than or equal to 400 nm and less than or equal to 700 nm in order to control wiring visibility in the display. For example, the conductive substrate preferably has an average reflectance less than or equal to 20%, more preferably less than or equal to 15%, and more preferably less than or equal to 12% for light with a wavelength greater than or equal to 400 nm and less than or equal to 700 nm.

The reflectance may be measured by irradiating light on the blackened layer of the conductive substrate. Specifically, for example, in the case where the metal layer 12 and the blackened layer 13 are successively laminated in the above recited order on the one surface 11a of the transparent base material 11 as shown in FIG. 1A, the reflectance can be measured by irradiating light on a surface A of the blackened layer 13. That is, light having a wavelength greater than or equal to 400 nm and less than or equal to 700 nm may be irradiated on the blackened layer 13 of the conductive substrate by changing the wavelength at 1 nm wavelength intervals to measure the reflectance, for example, and the average of the measured reflectance values may be regarded as the average reflectance of the blackened layer for light with a wavelength greater than or equal to 400 nm and less than or equal to 700 nm.

As described above, the conductive substrate according to the present embodiment can be suitably used as a conductive substrate for a liquid crystal touch panel, for example. When the conductive substrate according to the present embodiment is used as a conductive substrate for a liquid crystal touch panel, a meshed wiring can be arranged on the conductive substrate, for example.

A conductive substrate having a meshed wiring can be obtained by etching the metal layer and the blackened layer of the above-described conductive substrate according to the present embodiment.

Figure 3:
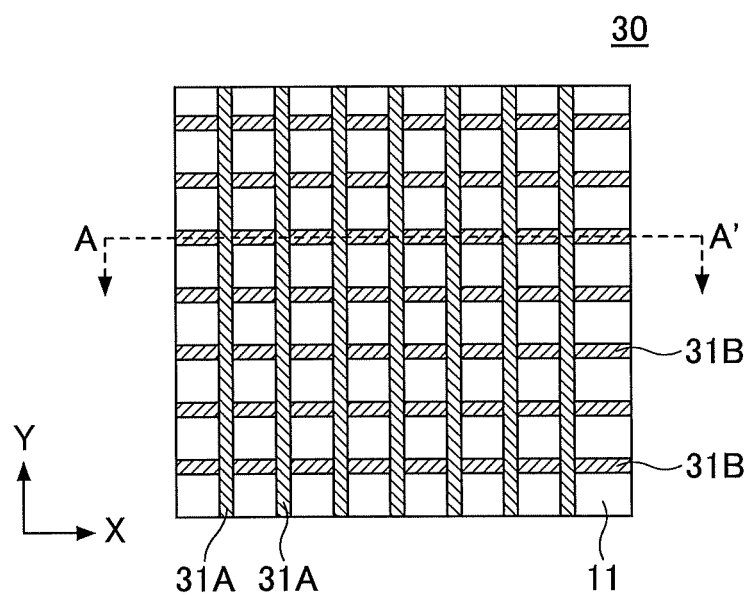
FIG. 3 is a top view of a conductive substrate having a meshed wiring according to an embodiment of the present invention.

For example, the meshed wiring can be famed by two layers of wiring. A specific configuration example of the meshed wiring is shown in FIG. 3. FIG. 3 shows a conductive substrate 30 having a meshed wiring as viewed from an upper plane along the laminating direction of the metal layer and the blackened layer. The conductive substrate 30 shown in FIG. 3 has a transparent base material 11, and wirings 31A and 31B, the wiring 31A being parallel to the Y axis direction and the wiring 31B being parallel to the X axis direction of FIG. 3. The wirings 31A and 31B are formed by etching metal layers, and the upper surface and/or the lower surface of the wirings 31A and 31B have the blackened layers formed thereon (not shown). Note that the blackened layer is etched to be in the same shape as the wirings 31A and 31B.

Figure 4A:
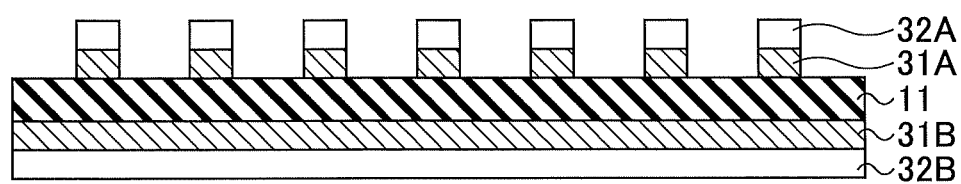
FIG. 4A is a cross-sectional view across line A-A' of FIG. 3.
Figure 4B:
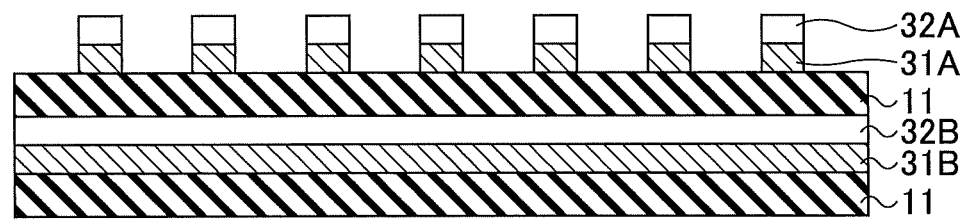
FIG. 4B is a cross-sectional view across line A-A' of FIG. 3.

The arrangement of the transparent base material 11 and the wirings 31A and 31B is not particularly limited. FIGS. 4A and 4B show example arrangements of the transparent base material 11 and the wirings. FIGS. 4A and 4B are example cross-sectional views of the conductive substrate 30 across line A-A' of FIG. 3.

As shown in FIG. 4A, the wirings 31A and 31B may respectively be arranged on the upper and lower surfaces of the transparent base material 11. In FIG. 4A, blackened layers 32A and 32B etched to be in the same shape as the wirings are respectively arranged on the upper surfaces of the wirings 31A and 31B.

Also, as shown in FIG. 4B, a pair of transparent base materials 11 may be used, the wirings 31A and 31B may respectively be arranged on the upper and lower surfaces of one of transparent base materials 11, and the wiring 31B may be interposed between the transparent base materials 11. Also, blackened layers 32A and 32B etched to be in the same shape as the wirings are respectively arranged on the upper surfaces of the wirings 31A and 31B. As described above, an adhesion layer may also be provided in addition to the blackened layer and the metal layer. As such, for example, in FIGS. 4A and 4B, an adhesion layer may be provided between the transparent base material 11 and at least one of the wirings 31A and 31B. In the case where an adhesion layer is provided, the adhesion layer is preferably etched into the same shape as that of the wiring 31A or 31B.

Figure 1B:
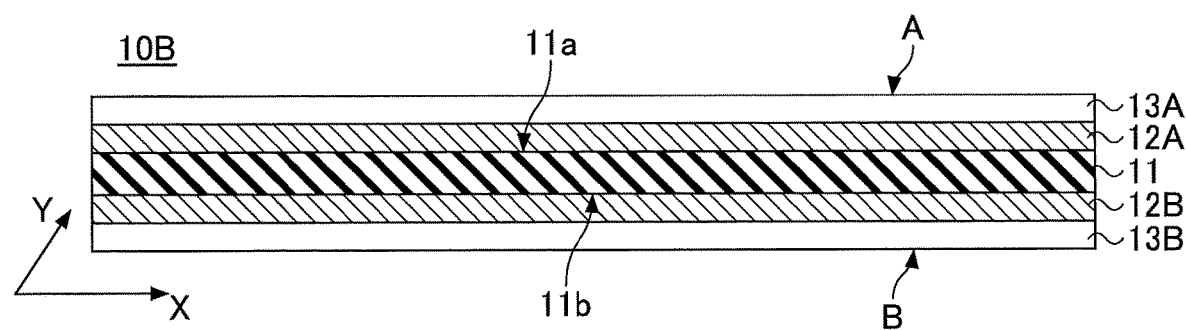
FIG. 1B is a cross-sectional view of a conductive substrate according to an embodiment of the present invention.

The conductive substrate having a meshed wiring as shown in FIGS. 3 and 4A may be formed from the conductive substrate as shown in FIG. 1B that has the metal layers 12A and 12B and the blackened layers 13A and 13B arranged on both surfaces of the transparent base material 11, for example.

In the case of using the conductive substrate as shown in FIG. 1B, first, the metal layer 12A and the blackened layer 13A on the one surface 11a of the transparent base material 11 are etched so that a plurality of linear patterns parallel to the Y axis direction in FIG. 1B are formed at predetermined intervals along the X axis direction. Note that the X axis direction in FIG. 1B corresponds to a direction parallel to the width direction of the layers. Also, the Y axis direction in FIG. 1B corresponds to a direction perpendicular to the paper surface of FIG. 1B.

Then, the metal layer 12B and the blackened layer 13B on the other surface 11b of the transparent base material 11 are etched so that a plurality of linear patterns parallel to the X axis direction in FIG. 1B are formed along the Y axis direction at predetermined intervals.

Through the above operations, a conductive substrate having a meshed wiring as shown in FIGS. 3 and 4A can be formed. Note that the surfaces of the transparent base material 11 may also be etched at the same time. That is, the metal layers 12A and 12B and the blackened layers 13A and 13B may be etched simultaneously. Also, a conductive substrate having the configuration as shown in FIG. 4A but additionally having adhesion layers patterned into the same shape as those of the wirings 31A and 31B interposed between the transparent base material 11 and the wirings 31A and 31B may be fabricated by etching the conductive substrate as shown in FIG. 2B in a similar manner.

The conductive substrate having a meshed wiring as shown in FIG. 3 can also be formed using two conductive substrates as shown in FIG. 1A or 2A, for example. In the case of using two conductive substrates as shown in FIG. 1A, for example, the metal layers 12 and the blackened layers 13 of the two conductive substrates shown in FIG. 1A are etched so that a plurality of linear patterns parallel to the X axis direction are formed at predetermined intervals along the Y axis direction. Then, the two conductive substrates are bound together facing each other so that the linear patterns formed on the two conductive substrates by the above etching process intersect with each other to form the conductive substrate having a meshed wiring. The surfaces of the two conductive substrates that are to be bound together are not particularly limited. For example, the surface A of one of the conductive substrates as shown in FIG. 1A that is laminated with the metal layer 12 and the like and the other surface 1ib of the other conductive substrate as shown in FIG. 1A that is not laminated with the metal layer 12 and the like may be bound together to fabricate a conductive substrate having a configuration as shown in FIG. 4B, for example.

Also, for example, the two conductive substrates may be bound together such that the surfaces 11b of the transparent base materials 11 that are not laminated with the metal layers 12 and the like as shown in FIG. 1A are bonded to each other to have a cross-sectional configuration as shown in FIG. 4A.

Note that a conductive substrate having the configuration as shown in FIG. 4A or 4B but additionally having adhesion layers patterned into the same shape as those of the wirings 31A and 31B interposed between the transparent base material 11 and the wirings 31A and 31B may be fabricated by using conductive substrates as shown in FIG. 2A instead of the conductive substrates as shown in FIG. 1A.

The widths and distances between the wirings of the conductive substrate having a meshed wiring as shown in FIGS. 3, 4A, and 4B are not particularly limited and can be selected in view of the amount of current flowing through the wirings, for example.

Also, although FIGS. 3, 4A, and 4B show examples of conductive substrates with meshed wirings (wiring patterns) that are formed by combining straight-line wirings, the present invention is not limited to such examples and the wirings configuring the meshed wiring pattern may be in any shape. For example, the wirings configuring the meshed wiring pattern may be arranged into jagged lines (zigzag lines) to prevent the occurrence of moiré patterns (interference patterns) between images on the display.

A conductive substrate having a meshed wiring that is made up of two layers of wiring as described above can be suitably used as a conductive substrate for a projected capacitive touch panel, for example.

The conductive substrate according to the present embodiment as described above can be used as a conductive substrate to be arranged on an image display surface of a liquid crystal panel, and the color of the blackened layer, when converted into the CIE (L*a*b*) color space, has a b* value controlled to be within a predetermined range. Thus, even when the backlight of the liquid crystal panel is turned off, the wiring of the conductive substrate may be inconspicuous.

(Liquid Crystal Touch Panel)

The conductive substrate as described above may be placed on and fixed to an image display surface of a liquid crystal panel to form a liquid crystal touch panel, for example. That is, a liquid crystal touch panel including the conductive substrate according to the present embodiment may be formed.

The method of fixing the conductive substrate on the image display surface of the liquid crystal panel is not particularly limited, and the conductive substrate can be fixed to the image display surface using a transparent adhesive or the like, for example.

In the liquid crystal touch panel according to the present embodiment, the color of the blackened layer of the conductive substrate, when converted into the CIE (L*a*b*) color space, has a b* value controlled to be within a predetermined range, and in this way, the wiring of the liquid crystal touch panel would not be visually conspicuous even when the backlight of the liquid crystal panel is turned off.

(Conductive Substrate Fabrication Method & Liquid Crystal Touch Panel Fabrication Method)

In the following, an example method of fabricating a conductive substrate according to the present embodiment will be described.

The method of fabricating a conductive substrate according to the present embodiment may include the following steps.

A metal layer forming step of forming a metal layer on at least one surface of a transparent base material; and a blackened layer forming step of forming a blackened layer on at least one surface of the transparent base material.

Further, the blackened layer that is formed by the blackened layer forming step is preferably configured such that, provided the color of the image display surface of the liquid crystal panel during backlight-off time, when converted into the CIE (L*a*b*) color space, has a b* value denoted as "$b^*_{panel}$", the color of the blackened layer, when converted into the CIE (L*a*b*) color space, has a b* value satisfying the following Formula 1.

$$(b^*_{panel}+1) \geq b^* \geq (b^*_{panel}-3.5)$$ Formula 1

In the following, the method of fabricating a conductive substrate according to the present embodiment is described in detail.

Note that the method of fabricating a conductive substrate according to the present embodiment can be used to fabricate the above-described conductive substrate according to the present embodiment. Thus, the above-described features of the conductive substrate apply to the descriptions below except as otherwise specified and overlapping descriptions will be omitted.

The transparent base material to be used in the metal foaming step may be prepared in advance, for example. Although the type of transparent base material to be used is not particularly limited, as described above, a resin substrate (resin film) that transmits visible light or a glass substrate may be suitably used, for example. The transparent base material may be cut into a desired size in advance as necessary, for example.

As described above, the metal layer preferably includes a metal thin film layer. Also, the metal layer may include a metal thin film layer and a metal plating layer. Thus, the metal layer forming step may include a step of forming a metal thin film layer by a dry plating method, for example. Also, the metal layer forming step may include a step of foiling a metal thin film layer by a dry plating method, and a step of forming a metal plating layer by an electroplating method, which is one type of wet plating method, using the metal thin film layer as a power feeding layer, for example.

Although the dry plating method used in the step of forming the metal thin film layer is not particularly limited, for example, a vapor deposition method, a sputtering method, or an ion plating method may be used. As an example of the vapor deposition method, a vacuum vapor deposition method can be suitably used, for example. Note that a sputtering method is more preferably used as the dry plating method in the step of foiling the metal thin film layer in view of facilitating control of the film thickness.

In the following, the step of foiling the metal plating layer will be described. Conditions for the step of forming the metal plating layer by a wet plating method, namely, electroplating process conditions, are not particularly limited, and various conditions for routine methods may be used. For example, a metal plating layer can be formed by introducing a base material having a metal thin film layer formed thereon into a plating tank containing a metal plating solution, and the metal plating layer can be formed by controlling the current density and the conveying speed of the base material.

In the following, the blackened layer forming step will be described.

The method for foaming the blackened layer is not particularly limited, and any method can be used. When forming the blackened layer in the blackened layer foaming step, a dry plating method, such as a vapor deposition method, a sputtering method, or an ion plating method may preferably be used, for example. In particular, a sputtering method is preferably used in view of facilitating control of the film thickness. Also, as described above, at least one element selected from the group consisting of carbon, oxygen, hydrogen, and nitrogen may be added to the blackened layer, and in this case, a reactive sputtering method is preferably used.

Also, as described above, the blackened layer may be formed using a wet method, such as electroplating, for example.

The blackened layer that is formed by the blackened layer forming step is preferably configured such that, provided the color of the image display surface of the liquid crystal panel during backlight-off time, when converted into the CIE (L*a*b*) color space, has a b* value denoted as "$b^*_{panel}$", the color of the blackened layer, when converted into the CIE (L*a*b*) color space, has a b* value satisfying the following Formula 1.

$$(b^*_{panel}+1) \geq b^* \geq (b^*_{panel}-3.5)$$ Formula 1

More preferably, provided the color of the image display surface during backlight-off time, when converted into the CIE (L*a*b*) color space, has an a* value denoted as "$a^*_{panel}$", the color of the blackened layer, when converted into the CIE (L*a*b*) color space, has an a* value satisfying the following Formula 2.

$$(a^*_{panel}+0) \geq a^* \geq (a^*_{panel}-3.5) \qquad \text{Formula 2}$$

Note that the method used to control the color of the blackened layer such that the b* value and the a* value of the color of the blackened layer, when converted into the CIE (L*a*b*) color space, are within the above predetermined ranges is not particularly limited. For example, the color of the blackened layer may be controlled to have a b* value and an a* value within the desired predetermined ranges by selectively adjusting the thickness and the material of the blackened layer. For example, at least one element selected from the group consisting of carbon, oxygen, hydrogen, and nitrogen can be added to the blackened layer, and in this case, the color of the blackened layer may be controlled to have the desired b* value and a* value by adjusting the amount of the one or more elements selected from the group consisting of carbon, oxygen, hydrogen, and nitrogen.

The method of fabricating a conductive substrate according to the present embodiment may optionally include some other step in addition to the above-described steps.

For example, in the case of forming an adhesion layer between the transparent base material and the metal layer, an adhesion layer forming step of forming an adhesion layer may be performed on the surface of the transparent base material on which the metal layer is to be formed. In the case of performing the adhesion layer forming step, the metal layer forming step may be performed after the adhesion layer forming step, and in the metal layer forming step, a metal thin film layer may be famed on the surface of a base material made up of the transparent base material having the adhesion layer formed thereon.

Although the method of forming the adhesion layer is not particularly limited, a dry plating method is preferably used to form the adhesion layer. Preferred examples of the dry plating method that may be used include a sputtering method, an ion plating method, and a vapor deposition method. In the case of forming the adhesion layer using a dry plating method, a sputtering method is preferably used in view of facilitating control of the film thickness. Note that at least one element selected from the group consisting of carbon, oxygen, hydrogen, and nitrogen may be added to the adhesion layer, and in this case, a reactive sputtering method is preferably used.

The conductive substrate obtained by implementing the method of fabricating a conductive substrate according to the present embodiment may be used in various applications, such as a touch panel. In the case of using the conductive substrate in various applications, the metal layer and the blackened layer included in the conductive substrate according to the present embodiment are preferably patterned. Also, in the case where an adhesion layer is provided, the adhesion layer is preferably patterned as well. The metal layer, the blackened layer, and the adhesion layer, if applicable, may be patterned into desired wiring patterns, for example. The metal layer, the blackened layer, and the adhesion layer, if applicable, are preferably patterned into the same shape.

In this respect, the method of fabricating a conductive substrate according to the present embodiment may additionally include a patterning step of patterning the metal layer and the blackened layer. Note that in the case where an adhesion layer is provided, the patterning step may be performed on the metal layer, the blackened layer, and the adhesion layer.

The specific procedure for implementing the patterning step is not particularly limited and any suitable procedure may be used. For example, in the case of performing the patterning step on the conductive substrate 10A as shown in FIG. 1A that is formed by laminating the metal layer 12 and the blackened layer on the transparent base material 11, first, a mask arranging step of arranging a mask having a desired pattern on the surface A of the blackened layer 13 may be performed. Then, an etching step may be performed that involves supplying an etching solution on the upper surface of the blackened layer 13, namely, the surface on which the mask has been arranged.

The etching solution used in the etching step is not particularly limited, and a suitable etching solution may be selected in view of the material constituting the layer to be etched. For example, the etching solution can be changed for each layer. Alternatively, the metal layer, the blackened layer, and the adhesion layer, if applicable, can be etched simultaneously using the same etching solution, for example.

Also, the patterning step may be performed on the conductive substrate 10B as shown in FIG. 1B that is formed by laminating the metal layers 12A and 12B and the blackened layers 13A and 13B on the one surface 11a and the other surface 11b of the transparent base material 11. In this case, for example, a mask arranging step may be performed that involves arranging masks with desired patterns on the respective surfaces A and B of the blackened layers 13A and 13B. Then, an etching step may be performed that involves supplying an etching solution to the surfaces A and B of the blackened layers 13A and 13B, namely, the surfaces on which the masks have been arranged.

The pattern to be formed in the etching step is not particularly limited, and the pattern may be in any shape. For example, in the case of etching the conductive substrate 10A as shown in FIG. 1A, the metal layer 12 and the blackened layer 13 can be etched to form a pattern including a plurality of straight lines or zigzag lines as described above.

Figure 2B:
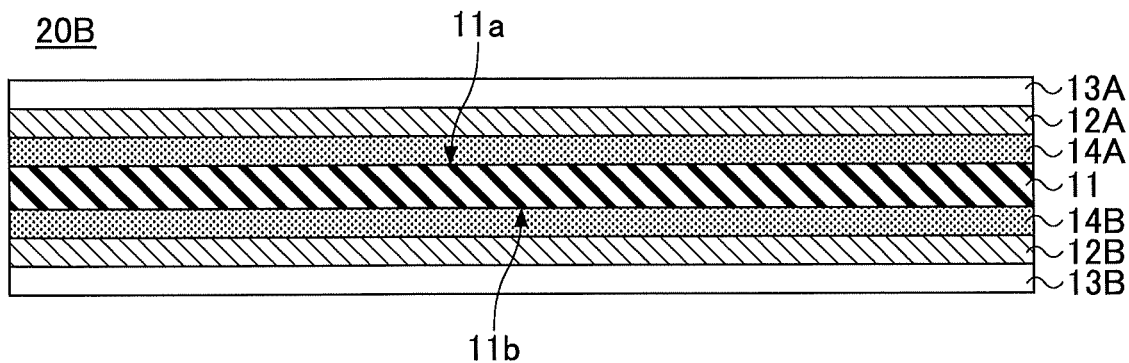
FIG. 2B is a cross-sectional view of a conductive substrate according to an embodiment of the present invention.

Also, in the case of etching the conductive substrate 10B as shown in FIG. 2B, patterns may be etched so that the metal layer 12A and the metal layer 12B form a meshed wiring. In this case, the blackened layer 13A is preferably patterned to be in the same shape as the metal layer 12A, and the blackened layer 13B is preferably patterned to be in the same shape as the metal layer 12B.

Also, after the patterning step is performed on the conductive substrate 10A such that the metal layer 12 and the like are patterned, a lamination step of laminating two or more patterned conductive substrates can be performed. In this case, for example, the conductive substrates may be laminated so that the patterns formed on the metal layers of the conductive substrates intersect with each other, and in this way, a laminated conductive substrate having a meshed wiring can be fabricated.

The method of affixing two or more conductive substrates that have been laminated is not particularly limited, and the conductive substrates may be affixed using adhesive, for example.

By implementing the method of fabricating a conductive substrate according to the present embodiment as described above, a conductive substrate to be arranged on an image display surface of a liquid crystal panel can be formed, and the color of a blackened layer of the conductive substrate, when converted into the CIE (L*a*b*) color space, may have a b* value that is controlled to be within a predetermined range. In this way, even when the backlight of the liquid crystal panel is turned off, the wiring of the conductive substrate may be inconspicuous.

In the case of fabricating a liquid crystal touch panel using the conductive substrate obtained by the method of fabricating a conductive substrate according to the present embodiment, a step of placing and fixing the conductive substrate on an image display surface of a liquid crystal panel may be performed, for example.

The method of fixing the conductive substrate on the image display surface of the liquid crystal panel is not particularly limited, and the conductive substrate can be fixed to the image display surface using a transparent adhesive or the like, for example.

In the liquid crystal touch panel according to the present embodiment, the b* value of the color of the blackened layer of the conductive substrate, when converted into the CIE (L*a*b*) color space, is within a predetermined range, and as such, the wiring of the liquid crystal touch panel may be inconspicuous even when the backlight of the liquid crystal panel is turned off.

EXAMPLES

In the following, specific examples of the present invention and comparative examples will be described. Note, however, that the present invention is not limited to these examples.

(1) Evaluation Method

First, evaluation methods used to evaluate samples of conductive substrates obtained in the examples and comparative examples are described.

(Average Reflectance)

Measurement was carried out by placing a reflectance measuring unit in an ultraviolet-visible spectrophotometer (Model: UV-2600, manufactured by Shimadzu Corporation).

In each of the examples and comparative examples described below, a conductive substrate having the configuration as shown in FIG. 1A was fabricated. Thus, reflectance measurement was carried out by irradiating light in the wavelength range of 400 nm to 700 nm onto the surface A of the conductive substrate 10A as shown in FIG. 1A at a 5° angle of incidence and a 5° acceptance angle while changing the wavelength of the irradiated light at 1 nm intervals to measure the reflectance (specular reflectance). Then, the average of the measured reflectance values was obtained as the average reflectance of the conductive substrate for light in the wavelength range of 400 nm to 700 nm. Note that the average reflectance for light in the wavelength range of 400 nm to 700 nm measured and calculated with respect to each of the conductive substrates obtained in the examples and comparative examples is indicated under the item "average reflectance" in Table 1 shown below.

(a* Value & b* Value of Blackened Layer)

Upon measuring and calculating the average reflectance, the a* value and b* value were calculated based on the reflectance measurement values obtained by irradiating light in the wavelength range of 400 nm to 700 nm, changed at 1 nm wavelength intervals, onto the surface of the blackened layer.

(Visibility Test)

A liquid crystal panel with an image display surface having an a* value "$a^*_{panel}$" equal to "−1" and a b* value "$b^*_{panel}$" equal to "−2" was prepared, and each of the conductive substrates fabricated in the examples and comparative examples was fixed to the image display surface of the liquid crystal panel using a transparent adhesive. Note that the conductive substrate was fixed to the image display surface of the liquid crystal panel so that the image display surface of the liquid crystal panel faces the other surface 11b of the transparent base material 11 of the conductive substrate fabricated to have the configuration as shown in FIG. 1A.

Then, visual inspection of the conductive substrate was conducted by five inspectors under light of a fluorescent lamp, and the number of inspectors who visually recognized the wiring of the conductive substrate while the backlight of the liquid crystal panel was turned off was counted.

In the case where the number of inspectors who visually recognized the wiring of the conductive substrate was 5, an evaluation of "X" was given. In the case where the number of inspectors who visually recognized the wiring of the conductive substrate was 1 to 4, an evaluation of "Δ" was given, and in the case where the number of inspectors who visually recognized the wiring of the conductive substrate was 0, an evaluation of "◯" was given.

(Conductive Substrate Fabrication Conditions)

Conductive substrates of the examples and comparative examples and liquid crystal touch panels were fabricated under the conditions described below.

Example 1

A conductive substrate having the cross-sectional configuration across a plane parallel to the lamination direction of the metal layer and the blackened layer as shown in FIG. 1A was fabricated and evaluated.

A transparent base material made of polyethylene terephthalate resin (PET) having a width of 500 mm and a thickness of 100 μm was prepared. Note that the total luminous transmittance of the transparent base material made of PET was 97% upon determining the total luminous transmittance of the transparent base material using the method prescribed in JIS K 7361-1.

Then, a copper layer having a thickness of 0.5 μm was formed as the metal layer on one surface of the transparent base material.

Note that the copper layer, constituting a copper thin film layer, was formed using a sputtering method.

The copper layer was formed by a sputtering method using a roll-to-roll sputtering apparatus. Specifically, first, a copper target and the above-described transparent base material were loaded in the roll-to-roll sputtering apparatus. Then, after evacuating the interior of a chamber to $1 \times 10^{-4}$ Pa, argon gas was introduced therein, and the pressure within the chamber adjusted to an argon atmosphere of 1.3 Pa. Then, electric power was supplied to the target under such atmosphere, and the transparent base material was conveyed to have a copper layer formed on one main plane of the transparent base material.

Then, a blackened layer was formed on the upper surface of the copper layer. As in the case of the copper layer, the blackened layer was formed by a sputtering method using the roll-to-roll sputtering apparatus. A nickel-copper layer having oxygen added thereto was formed as the blackened layer.

Specifically, first, a nickel-copper alloy target with a composition of 65 wt % nickel and 35 wt % copper and the transparent base material having the copper layer formed thereon were loaded in the roll-to-roll sputtering apparatus. Then, after evacuating the interior of the chamber to $1 \times 10^{-4}$ Pa, argon gas was introduced into the chamber at 200 sccm, oxygen gas was introduced into the chamber at 43 sccm, and the pressure within the chamber was adjusted to 2 Pa. Then, electric power was supplied from a DC power supply to a sputtering cathode while conveying the transparent base material having the copper layer formed thereon at a conveying speed of 3.0 m/min from a winding roll, and sputtering discharge was performed to form a blackened layer on the copper layer. Through such operation, a blackened layer having a thickness of 50 nm was formed on the copper layer of the transparent base material.

With respect to the conductive substrate fabricated in the above-described manner, the average reflectance and the a* value and the b* value of the blackened layer were measured using the above-described evaluation methods. The results of the evaluations are shown in Table 1 below.

Then, a commercially available dry film resist was applied to the blackened layer of the conductive substrate by a lamination method. Then, a photosensitive resist pattern was formed by irradiating ultraviolet rays via a mask for forming a latticed mesh pattern with a wiring width of 4 μm.

Then, a ferric chloride solution heated to 30° C. was supplied to an opening in the photosensitive resist pattern, the blackened layer and the copper layer exposed at the opening were removed by etching, and the photosensitive resist pattern was peeled off thereafter. In this way, a conductive substrate with a copper layer and a blackened layer that have been patterned was formed, and the above-described visibility test was performed on the conductive substrate. The results of the evaluation are shown in Table 1 below.

Example 2 to Example 4

In Examples 2 to 4, conductive substrates were fabricated in a manner similar to Example 1, aside from adjusting the conveying speed of the transparent base material having a copper layer formed thereon and the amount of oxygen gas supplied to the chamber when forming the blackened layer to the values indicated in Table 1, and the conductive substrates were evaluated by the above evaluation methods. The results of the evaluations are indicated in Table 1 below.

Comparative Example 1 & Comparative Example 2

In Comparative Examples 1 and 2, conductive substrates were fabricated in a manner similar to Example 1, aside from adjusting the conveying speed of the transparent base material having a copper layer formed thereon and the amount of oxygen gas supplied to the chamber when forming the blackened layer to the values indicated in Table 1, and the conductive substrates were evaluated by the above-described evaluation methods. The results of the evaluations are indicated in Table 1 below.

TABLE 1

| | BLACKENED LAYER FORMING CONDITIONS | | | CONDUCTIVE SUBSTRATE EVALUATION RESULTS | | | | |
|---|---|---|---|---|---|---|---|---|
| | | | | | | | VISIBILITY TEST | |
| | | | | | | | INSPECTION | |
| | CONVEYING SPEED | SPUTTERING GAS FLOW RATE (sccm) | | AVERAGE | | | RESULT (HEAD | |
| | (m/min) | ARGON | OXYGEN | REFLECTANCE (%) | a* | b* | COUNT/5) | EVALUATION |
| EXAMPLE 1 | 3 | 200 | 43 | 15 | −4.6 | −1.2 | 2/5 | Δ |
| EXAMPLE 2 | 3 | 200 | 48 | 11.5 | −6.6 | −4.2 | 1/5 | Δ |
| EXAMPLE 3 | 3.6 | 200 | 44 | 11 | −4.5 | −4.9 | 0/5 | ○ |
| EXAMPLE 4 | 3.6 | 200 | 48 | 9.4 | −4.4 | −5.5 | 0/5 | ○ |
| COMPARATIVE EXAMPLE 1 | 3 | 200 | 30 | 14.9 | −1.8 | 1.8 | 5/5 | x |
| COMPARATIVE EXAMPLE 2 | 3.6 | 200 | 30 | 15.4 | 0.3 | 1.9 | 5/5 | x |

Based on the evaluation results indicated in Table 1, it can be appreciated that evaluations of "X" were obtained as a result of conducting the visibility test with respect to the conductive substrates of Comparative Examples 1 and 2 in which the relationship between the b* value "$b^*_{panel}$" of the image display surface of the liquid crystal panel during backlight-off time and the b* value of the blackened layer does not satisfy the following Formula 1. That is, it could be confirmed that when the conductive substrates of these comparative examples are arranged on liquid crystal panels, the wirings of the conductive substrates are visually conspicuous when the backlight of the liquid crystal panel is turned off.

$$(b^*_{panel}+1) \geq b^* \geq (b^*_{panel}-3.5) \quad \text{Formula 1}$$

On the other hand, evaluations of "Δ" or "○" were obtained as a result of conducting the visibility test with respect to the conductive substrates of Examples 1 to 4 in which the b* value of the blackened layer satisfies the above Formula 1. It could be confirmed from the above that when the conductive substrates of the above examples are arranged on liquid crystal panels, the wirings of the conductive substrates may be prevented from becoming visually conspicuous.

In particular, evaluations of "○" were obtained as a result of conducting the visibility test with respect to the conductive substrates of Examples 3 and to 4 in which the relationship between the a* value "$a^*_{panel}$" of the image display surface of the liquid crystal panel during backlight-off time and the a* value of the blackened layer satisfies the following Formula 2, thereby confirming that when the conductive substrates of these examples are arranged on liquid crystal panels, the wirings of the conductive substrates can be even less conspicuous.

$$(a^*_{panel}+0) \geq a^* \geq (a^*_{panel}-3.5) \quad \text{Formula 2}$$

Also, the average reflectance of each of the conductive substrates of Examples 1 to 4 was less than or equal to 20%, thereby confirming that light reflection by the metal layer can be controlled by providing the blackened layer.

Although the conductive substrate and the liquid crystal touch panel according to the present invention have been described above with respect to certain illustrative embodiments and examples, the present invention is not limited to the above embodiments and examples, and various modifications and changes can be made within the scope of the present invention.

The present application is based on and claims the benefit of priority of Japanese Patent Application No. 2015-093576 filed on Apr. 30, 2015, the entire contents of which are herein incorporated by reference.

DESCRIPTION OF THE REFERENCE NUMERALS 10A, 10B, 20A, 20B, 30 conductive substrate
11 transparent base material
12, 12A, 12B metal layer
13, 13A, 13B, 32A, 32B blackened layer

The invention claimed is:

1. A conductive substrate that is arranged on an image display surface of a liquid crystal panel, the conductive substrate comprising:
a transparent base material;
a metal layer formed on at least one surface of the transparent base material via an adhesion layer; and
a blackened layer formed on at least one surface of the transparent base material;
wherein the adhesion layer, the metal layer, and the blackened layer are successively laminated in this order on at least one surface of the transparent base material,
wherein the adhesion layer contains at least one metal selected from Ni, Zn, Mo, Ta, Ti, V, Cr, Fe, Co, W, Cu, Sn and Mn, and
wherein, provided a color of the image display surface of the liquid crystal panel during backlight-off time, when converted into the CIE (L*a*b*) color space, has a b* value denoted as "$b^*_{panel}$", a color of the blackened layer, when converted into the CIE (L*a*b*) color space, is caused to have a b* value that satisfies the following formula by adjusting an amount of one or more elements that are added to the blackened layer and are selected from carbon, oxygen, hydrogen, and nitrogen:

$$(b^*_{panel}+1) \geq b^* \geq (b^*_{panel}-3.5).$$

2. The conductive substrate according to claim 1, wherein provided the color of the image display surface of the liquid crystal panel during backlight-off time, when converted into the CIE (L*a*b*) color space, has an a* value denoted as "$a^*_{panel}$", the color of the blackened layer, when converted into the CIE (L*a*b*) color space has an a* value satisfying the following Formula 2formula:

$$(a^*_{panel}+0) \geq a^* \geq (a^*_{panel}-3.5).$$

3. The conductive substrate according to claim 1, wherein the conductive substrate has an average reflectance that is less than or equal to 20% with respect to light having a wavelength greater than or equal to 400 nm and less than or equal to 700 nm.

4. The conductive substrate according to claim 1, wherein the metal layer is a copper layer or a copper alloy layer.

5. The conductive substrate according to claim 1, wherein the transparent substrate is a polyethylene terephthalate film.

6. A liquid crystal touch panel comprising:
the conductive substrate according to claim 1.

* * * * *